(12) United States Patent
Renaud et al.

(10) Patent No.: US 11,015,326 B2
(45) Date of Patent: May 25, 2021

(54) MECHANICALLY OPERATED HOT WATER BYPASS VALVE OPERATED WITHOUT ELECTRICITY

(71) Applicant: Taco, Inc., Cranston, RI (US)

(72) Inventors: Andre Renaud, Coventry, RI (US); Peter Vandal, Mattapoisett, MA (US)

(73) Assignee: Taco, Inc., Cranston, RI (US)

( * ) Notice: Subject to any disclaimer, the term of this patent is extended or adjusted under 35 U.S.C. 154(b) by 131 days.

(21) Appl. No.: 15/125,894

(22) PCT Filed: Sep. 11, 2015

(86) PCT No.: PCT/US2015/049757
§ 371 (c)(1),
(2) Date: Sep. 13, 2016

(87) PCT Pub. No.: WO2016/040849
PCT Pub. Date: Mar. 17, 2016

(65) Prior Publication Data
US 2017/0175368 A1 Jun. 22, 2017

Related U.S. Application Data

(60) Provisional application No. 62/049,709, filed on Sep. 12, 2014.

(51) Int. Cl.
*E03C 1/04* (2006.01)
*F16K 31/00* (2006.01)
(Continued)

(52) U.S. Cl.
CPC ........ *E03C 1/0404* (2013.01); *F16K 27/0209* (2013.01); *F16K 31/002* (2013.01);
(Continued)

(58) Field of Classification Search
CPC .. F16K 27/0209; F16K 31/002; F16K 31/003; F16K 31/56; E03B 7/045; G05D 23/08; G05D 23/1854
(Continued)

(56) References Cited

U.S. PATENT DOCUMENTS

| 1,972,170 | A | * | 9/1934 | Spencer | G05D 23/10 137/543.13 |
| 2,192,117 | A | | 2/1940 | Wile | |

(Continued)

FOREIGN PATENT DOCUMENTS

| DE | 10228510 B4 | 9/2013 |
| WO | WO8604131 | 7/1986 |

OTHER PUBLICATIONS

Armstrong Astro Express Valve—See attached drawing for inventors best understanding of the valve.

*Primary Examiner* — Marc E Norman
*Assistant Examiner* — Schyler S Sanks
(74) *Attorney, Agent, or Firm* — Sutton Magidoff Barkume LLP

(57) ABSTRACT

An improved, wholly mechanical, valve unit is provided to automatically allow for flow between a high temperature liquid line and a cooler temperature liquid line in order to maintain the immediate availability of hot liquid immediately upstream of the valve, especially for hot water used in a building. The valve unit of the present invention includes a thermally-activated, bi-metal, or more broadly bi-flexive, valve disc, and a smaller diameter valve seat that concentrically contacts the valve disc intermediate the outer circumference and the center of the disc. The bi-flexive disc is provided two-sided, circumferential support, thus substantially equalizing the pressure against both sides of the disc, even when in the closed valve position between the higher temperature, higher pressure, hot water line and the lower (Continued)

pressure cold water line. The valve opens when the temperature differential across the valve disc decreases below a preset amount.

13 Claims, 6 Drawing Sheets

(51) Int. Cl.
  *F24D 17/00* (2006.01)
  *F16K 27/02* (2006.01)
  *E03B 7/04* (2006.01)
(52) U.S. Cl.
  CPC ........ *F16K 31/003* (2013.01); *F24D 17/0078* (2013.01); *E03B 7/045* (2013.01)
(58) Field of Classification Search
  USPC .......................................... 236/12.11, 101 R
  See application file for complete search history.

(56) References Cited

U.S. PATENT DOCUMENTS

| | | | |
|---|---|---|---|
| 3,022,039 A | 2/1962 | Cone et al. | |
| 3,750,701 A | 8/1973 | Botnick | |
| 4,068,800 A * | 1/1978 | Doherty, Jr. | ........... G05D 23/08 236/101 C |
| 4,132,239 A | 1/1979 | Bowen et al. | |
| 4,207,361 A * | 6/1980 | Izbicki | .................... C23C 18/54 427/328 |
| 4,243,062 A | 1/1981 | Shelton | |
| 4,331,292 A * | 5/1982 | Zimmer | .................. F24D 17/00 137/337 |
| 4,382,899 A * | 5/1983 | Johnson | .................. F02M 1/10 123/401 |
| 5,402,815 A * | 4/1995 | Hoch, Jr. | .................. E03B 7/10 137/80 |
| 5,574,421 A | 11/1996 | Hickling | |
| 6,024,174 A | 2/2000 | Pierce | |
| 6,450,412 B1 * | 9/2002 | Cessac | ................... G05D 23/10 236/48 R |
| 6,536,676 B2 | 3/2003 | Smith | |
| 7,073,528 B2 | 7/2006 | Kempf et al. | |
| 7,140,382 B2 | 11/2006 | Kempf et al. | |
| 7,474,498 B2 | 1/2009 | Biskeborn | |
| 8,602,052 B2 | 12/2013 | Keeper et al. | |
| 8,820,652 B2 | 9/2014 | Kempf et al. | |
| 9,170,584 B2 | 10/2015 | Lum et al. | |
| 2007/0114290 A1 * | 5/2007 | Kempf | .................... E03B 7/045 236/12.13 |
| 2011/0132989 A1 * | 6/2011 | Kempf | .................... E03B 7/045 236/12.11 |
| 2012/0024968 A1 * | 2/2012 | Beyerle | ............. G05D 23/1346 236/12.11 |

* cited by examiner

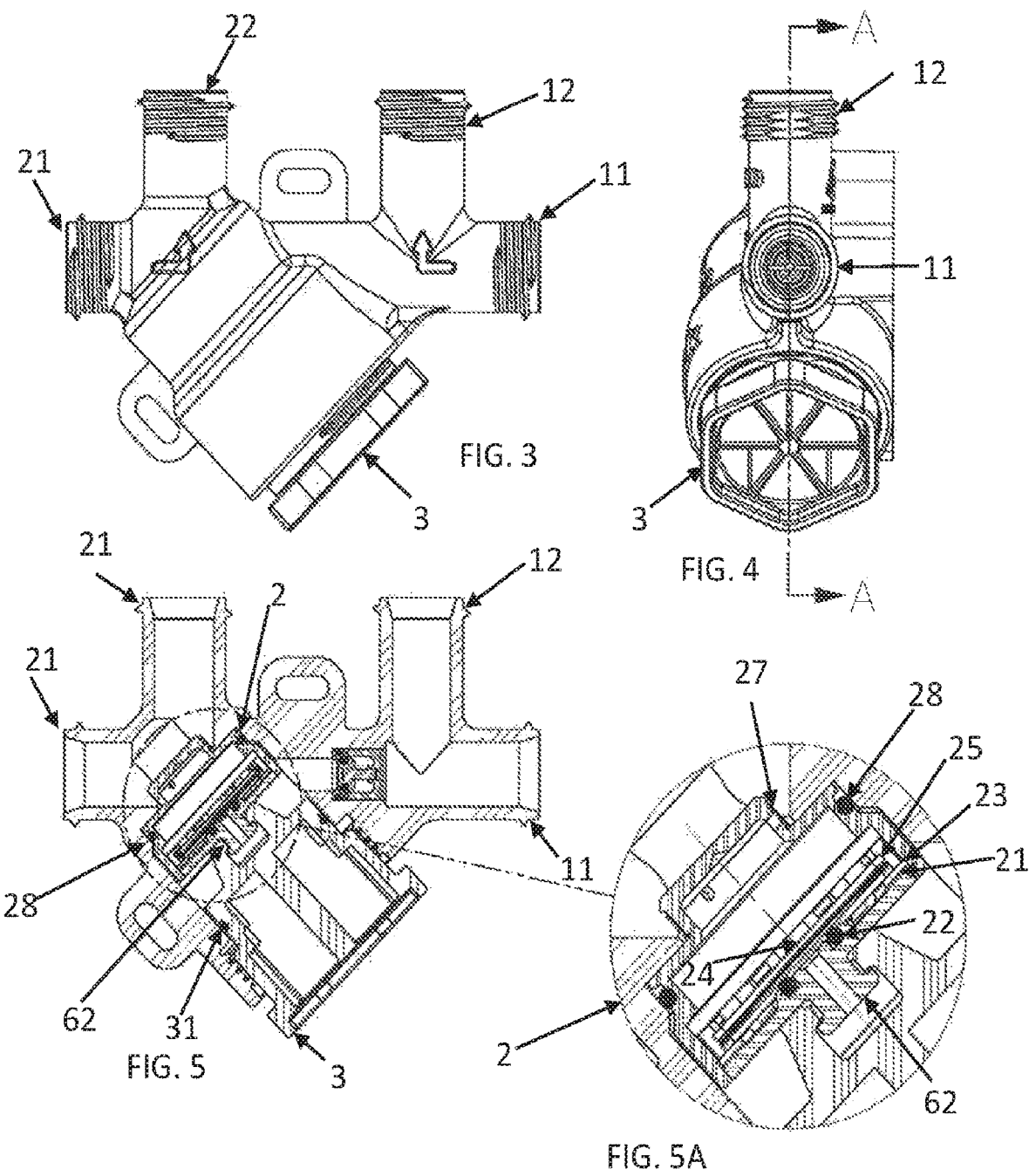

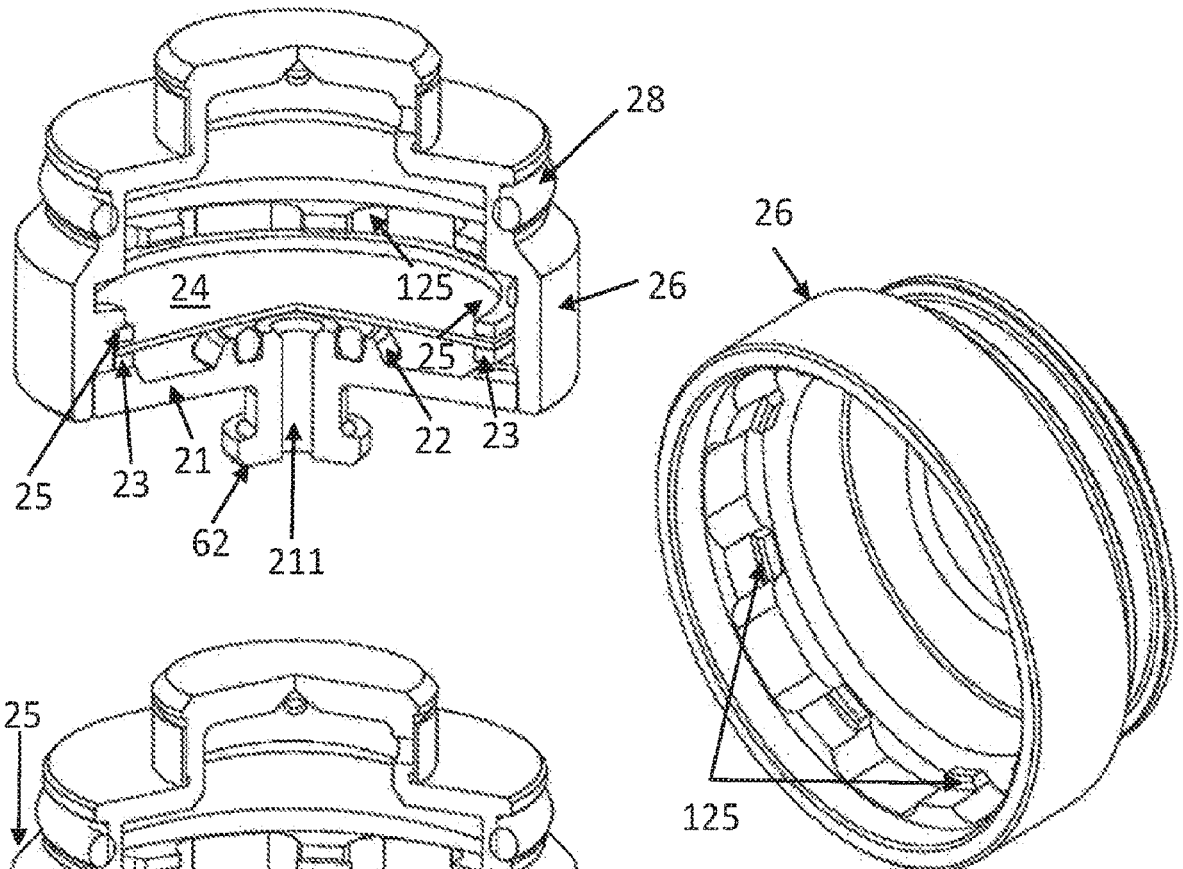
FIG. 7
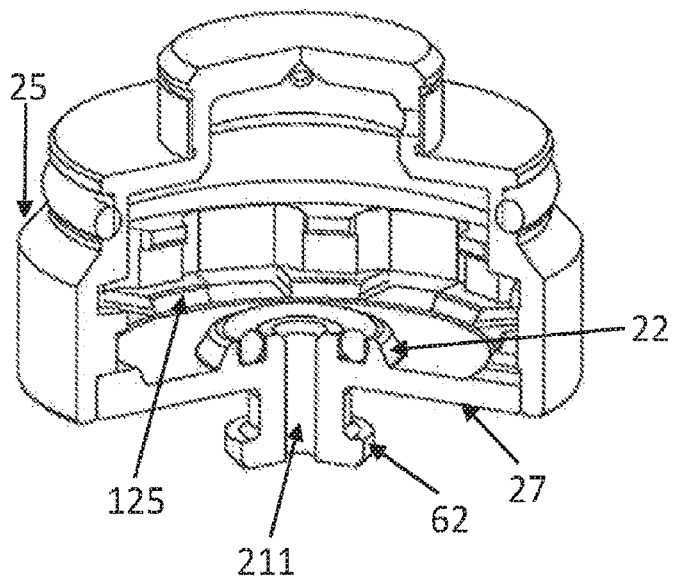
FIG. 7A
FIG. 8

MECHANICALLY OPERATED HOT WATER BYPASS VALVE OPERATED WITHOUT ELECTRICITY

This invention relates to a system for committing hot water bypass from a hot water line to the cold water line in order to inter alia provide instant hot water from any given hot water tap.

BACKGROUND OF THE INVENTION

Many systems have been devised for providing instantaneous hot water from a hot water tap in order to avoid unnecessary wasting of water while waiting for hot water to reach a particular tap after an extended period of non use. Especially during a cold winter season, hot water lines between a hot water heater and a particular tap, especially one several floors above the hot water heater, are likely to contain a substantial quantity of cold water that must be exhausted before the water coming from the tap is hot. There are many parts of the world, including many portions of the United States, where wasting of water has become a serious issue, threatening the very ability to maintain a civilized existence in specific areas. There are systems that are electronically operated that provide a useful and credible way of continuing to flow hot water through a hot water line so that hot water is substantially immediately available upon opening any hot water line due to the fact that the hot water line interconnects to a cold water line that flows back into the heater, and that way instantaneous hot water can be provided without wasting water down a drain and efficiently providing the hot water.

The prior art included two types of systems to accomplish this. One includes thermostatically controlled pumps and thermostatically controlled valves, using thermistors in the hot water line that turn on electric motor drives to permit water from a hot water line to flow into a cold water line, so as to bring hot water to the pump. The pumps and valves are powered by electric motors. However, it becomes awkward in many jurisdictions to have a live electric outlet in a bathroom, adjacent water, especially when located under a flowing water sink.

A second system includes automatic mechanical valves that respond to temperature differences between the hot and cold water lines, which change as a result of the cooling of the hot water line, when there is no flow. The changing temperature differential causes flexing of a valve operator to open or close a line. Such a valve is used combined with a pressure maintenance operation, such as a small pump, which maintains a small pressure drop between the hot water line and the cold water line beneath a sink. Such valves include a wax motor-driven valve that does not utilize a thermostatically responsive, flexing, disc. Another type of wholly mechanical valves uses a thermostatically responsive flexing bi-flexive disc, serving as the valve disc, which flexes towards and away from the valve seat so as to open the valve when the temperature differential is below a defined value, as shown in U.S. Pat. Nos. 6,024,174 and 6,536,676, among others.

One such prior art disc valve is sold by the Armstrong Pumps Inc. company of North Tonawanda, N.Y., under the name Armstrong Astro Express Hot Water Recirculation System. This product utilized a bi-metal disc having a central hole through the disc.

GENERAL DESCRIPTION OF THIS INVENTION

In accordance with the present invention, an improved, wholly mechanical valve unit is provided to allow for flow between a high temperature liquid line and a cooler temperature liquid line in order to maintain the immediate availability of hot liquid immediately upstream of the valve, the valve being placed upstream of a hot liquid outlet and cooler liquid pipe bringing cool liquid to a heater for the hot liquid. Most commonly this invention will be used for hot water in a building. In such a system, the cold water line returns, at least in part, to the hot water source, whether it be a heated water tank or an immediate flow heater, and no water is wasted by being passed down a drain to a sewer or septic tank.

The present invention improves on the prior art types of mechanical valves, based upon a thermally-activated, bi-metal, or more broadly bi-flexive, disc, by optimizing the flow path of the liquid from the higher temperature, higher pressure, line to the lower temperature line, based upon the support provided to the disc, both when in a closed position and in an open position. By providing two-sided, circumferential support of the bi-flexive disc and substantially equalizing the pressure against both sides of the disc, even when in the closed valve position, the durability and accuracy of the disc valve is improved, while maintaining required flow potential. There is also provided additional central support in the closed position, that the bimetal disc is less likely to be damaged by any excessive pressure differential or unusually high temperatures that may occur either accidentally or as part of the normal operation of the overall system. One use for this type of bimetal disc valve is for an undersink connection between the hot and cold water lines to ensure that there is always hot water close to the hot water tap so as to avoid having to run the hot water tap for extended periods of time, thus wasting water before a suitable temperature is reached.

The operational heart of the thermostatic valve of this invention is a known bi-flexive, usually bi-metal, thermostatic disc formed of two different materials, usually two metal alloys, having different thermal expansion properties. Generally, the alloy having the greater thermal expansion value is placed in contact with the higher temperature fluid stream and the face having the lower thermal expansion property is in contact with the cooler fluid stream. Generally these discs vary in size from approximately 0.3 inch to 1.5 inches in diameter and a total thickness in the range of less than 0.5 inch, and preferably not greater than 0.03 inch, in thickness. These discs are readily available on the open market and have the general property that at the higher temperature the surface of the disc is cupped spherically in one direction and at a lower temperature the surface curvature is quickly reversed, i.e., by a 'snap'.

The exact temperature at which the curvature snap occurs is dependent upon the property of the bi-flexive construction, including its size and, most significantly, the material forming the two sandwiched discs. Suitable discs are generally characterized by their ASTM designation and it has been found that useful discs include those formed of ASTM designation TM1 and TM2. There are also a range of industry designations in addition to the ASTM designations, for example, Truflex standards; these industry standards are available from EMS (Engineered Material Solutions).

Examples of suitable thermostatic discs include one where the high temperature side is primarily a nickel-chromium-iron alloy on one side, and a nickel-iron alloy on the opposite side to form the TM1 bi-metal disc. The TM2 disc, on the other hand, contains primarily a manganese alloy with nickel and copper, on the high temperature side, and a nickel-iron alloy on the low temperature side. The selection of a suitable disc, either TM1 or TM2, or any of the many other ASTM or Truflex bi-flexive discs available, depends upon the requirements for a particular valve, such as the need for corrosion resistance of the materials, the ability to use a corrosion protective coating, and the degree of movement necessary from the snap action. Although the lack of manganese can be considered a durability enhancement, the addition of manganese does result in a higher flexibility value and thus greater range of movement. The presence of manganese does usually require a coating in order to enhance corrosion resistance.

In the present environmental situations in many part of the U.S. as well as in other countries of the world, water has become an increasing valuable commodity and one which users cannot and should not afford to waste. The following drawings, and the ensuing verbal descriptions, show and describe a preferred embodiment or embodiments of this invention by way of illustration of one of the modes best suited to carry out and use the present invention. As it will be realized, the invention is capable of other different embodiments and uses and its several details are capable of modification to various obvious aspects, all without department from the scope of the invention. The following drawings and descriptions should be regarded as illustrative in nature and not as restrictive.

BRIEF DESCRIPTION OF THE DRAWINGS

The accompanying drawings incorporate and form a part of this description and illustrate aspects of the present invention which, together with the verbal text, explains the principles of the invention, while providing a specific example thereof. Referring to the drawings:

FIG. 3 is a front view of the fully constructed system and valve body of FIG. 1;

FIG. 4 is a side view of the fully constructed valve body of FIG. 1;

FIG. 5 is a cross-section view, taken along lines AA of FIG. 4;

FIG. 5A is a slightly magnified view of the primary system valve included in FIG. 5;

FIG. 7 is a partially cutaway view of the cartridge subassembly of the bimetal disc valve;

FIG. 7A shows the cutaway view of FIG. 7, with the bimetal disc and washers removed;

FIG. 8 is an isometric view of the cartridge body of FIG. 7, showing the circumferential flow channels, referring next to the details of an embodiment of the invention, as illustrated in the accompanying drawings.

DETAILED DESCRIPTION OF AN EMBODIMENT OF THE PRESENT INVENTION

Figure 1:
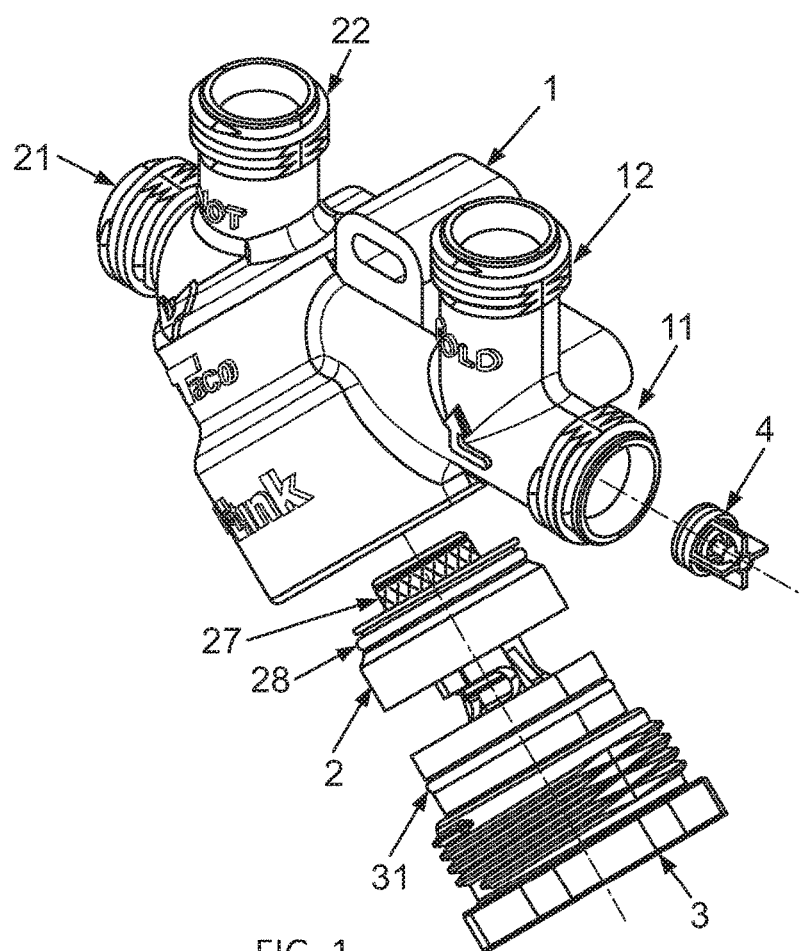
FIG. 1 is an overall perspective view, partially exploded, showing the two operating mechanisms, the cartridge assembly and flow check valves, present in the overall system body.

The outer valve body, generally designated by the numeral 1, includes the hot and cold water connections, specifically the inlet from the cold water source 11 and the outlet 12 to the cold water tap in the sink above, and the inlet from the hot water source 21, whether it is a hot water heater or a hot water tank 30 as shown in FIG. 1A, and the hot water outlet line 22, leading to the tap in the sink above, by-passing the thermostatic valve. Inside the valve body 1 is located the primary bimetallic disc valve cartridge, generally indicated by the numeral 2, which opens and closes the connection between the hot and cold water lines; when open, when valve allows the flow of cooled hot water to the cold water line 11. In the inlet 11 from the cold water source, is an integral flow check valve 4, located inside of the valve body in the cold water inlet side, as shown in FIG. 1, to prevent cold water from flowing into the hot water side of the device when the bimetallic disc valve is opened, and the pressure between the two lines is not the intended affirmative pressure in favor of the hot water line.

Figure 2:
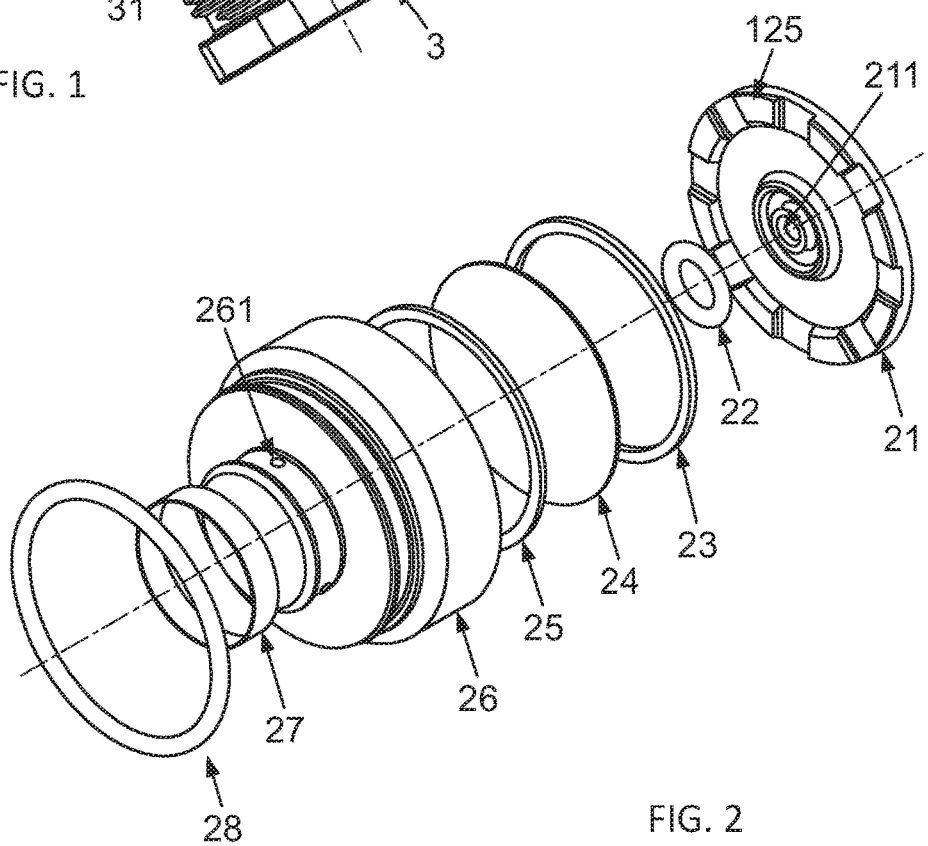
FIG. 2 is an exploded view of the thermostatically operated primary valve portion of the system of FIG. 1.

The interior of the bi-flexive disc cartridge subassembly 2, as shown in FIGS. 2, 5 and 5A, includes a wire mesh filter screen 27, in front of the fluid inlet flow hole 261, to prevent debris or sediment from passing to the bimetallic disc area, which could restrict flow through the open bi-flexive disc valve 24.

The bimetallic disc 24 is structurally supported around its external circumference within the cartridge body 26 during both the open flow and closed conditions by two annular washers 23,25; these washers 23,25 are preferably made of a material softer than the material forming the bi-flexive disc, and include other metals or polymers such as polytetra fluoroethylese polymer, e.g., sold as Teflon, by DuPont. The subassembly of the bimetal disc valve is threadedly secured into the valve body 1 by valve stem 3. Leakage of liquid is prevented during the closed position of the bimetal disc valve by external O rings 31 and 28, which prevent fluid leakage external of the device.

Figure 6:
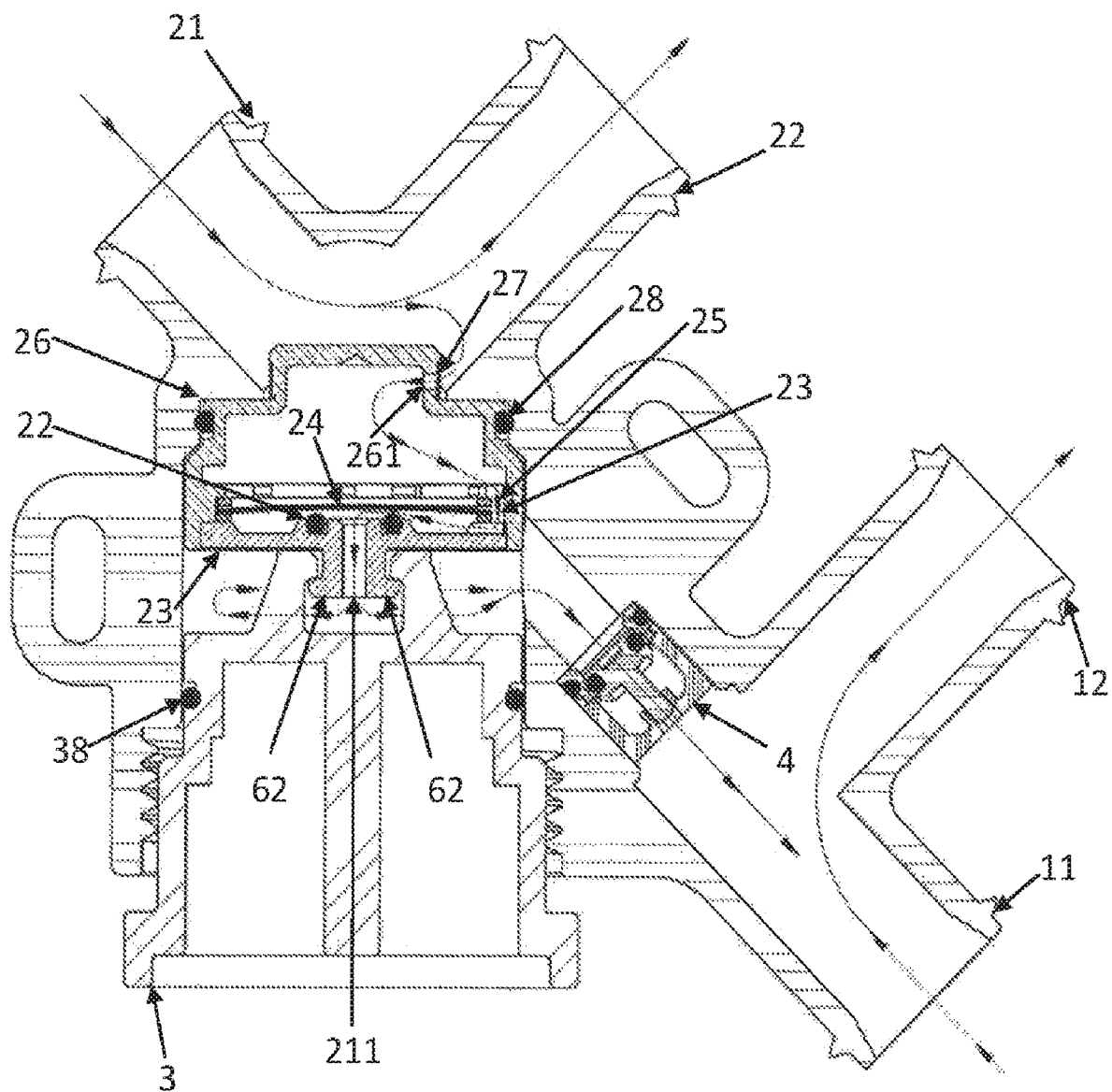
FIG. 6 is an enlarged cross-section view thermostatically operated bimetal disc valve in an open position.

The bimetal disc 24 is supported within the cartridge body by the washers 23,25 and, in the closed condition, the central washer 22, and the internal walls of the cartridge body 26. Flow channels are formed in the cartridge body 26 and the cartridge tailpiece 21, to allow fluid flow around the bimetal disc 24 and its two supporting washers 23,25, when the disc is in the closed position (see FIG. 6B) to equalize the pressure on the two sides of the disc in the closed position. This is accomplished by having the circumferential supporting washers 23,25 resting on a scalloped surface of the top and bottom covers 21, 26 of the disc cartridge, which allows for pressure equalizing flow between the two major surfaces, i.e., the upstream hot water line facing surface and the cold water line facing surface of the disc 24. It is only the small central portion of the cold water line facing surface of the disc, surrounded by the centrally located O-ring 22 that is not exposed to the upstream pressure in the closed position of the valve. In the closed position, net flow out of the valve body must be sealed off by the central portion of the bimetal disc 24 pressing against the centrally located face-sealing O-ring 22; this prevents the flow of hot water into the cold water line 22, when the disc is in a closed position, as shown in FIG. 6B.

This system is especially useful for situations where only relatively low flow past the open valve is required. For example, if the primary purpose for a valve is to provide for an on demand hot water system, permitting a small flow of hot water past a tap that is not regularly used in order to maintain suitably high temperature water readily available for use, only a small flow is usually required. Thus, a disc having a diameter in the range of 0.5 to 1.5 inches and a thickness in the range of 0.01 to 0.03 inch has been found to be useful; the amount of fluid flow obtainable is dependent upon the degree of flexivity of the two sandwiched alloys, that is the distance moved by the central part of the disc, as the disc snaps back and forth with changes in temperature in the hot water line. It has been found that sufficient flow for this purpose can be achieved with an area of flow in the range of 0.0005 to 1.77 square inches, with a flow gap for net outward flow between the center of the valve disc 24 and the central o-ring valve seat 22, of from 0.002 inch to 0.2 inch.

Figure 6A:
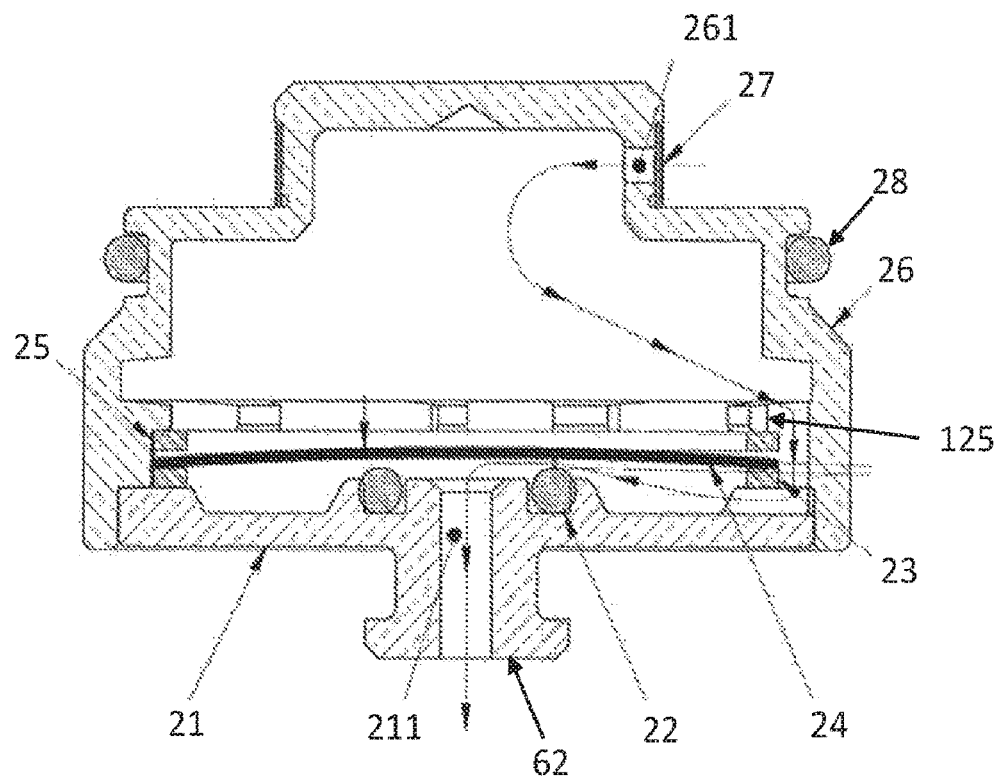
FIG. 6A is a detailed view of the thermostatically operated valve cartridge of FIG. 6 in the open position.
Figure 6B:
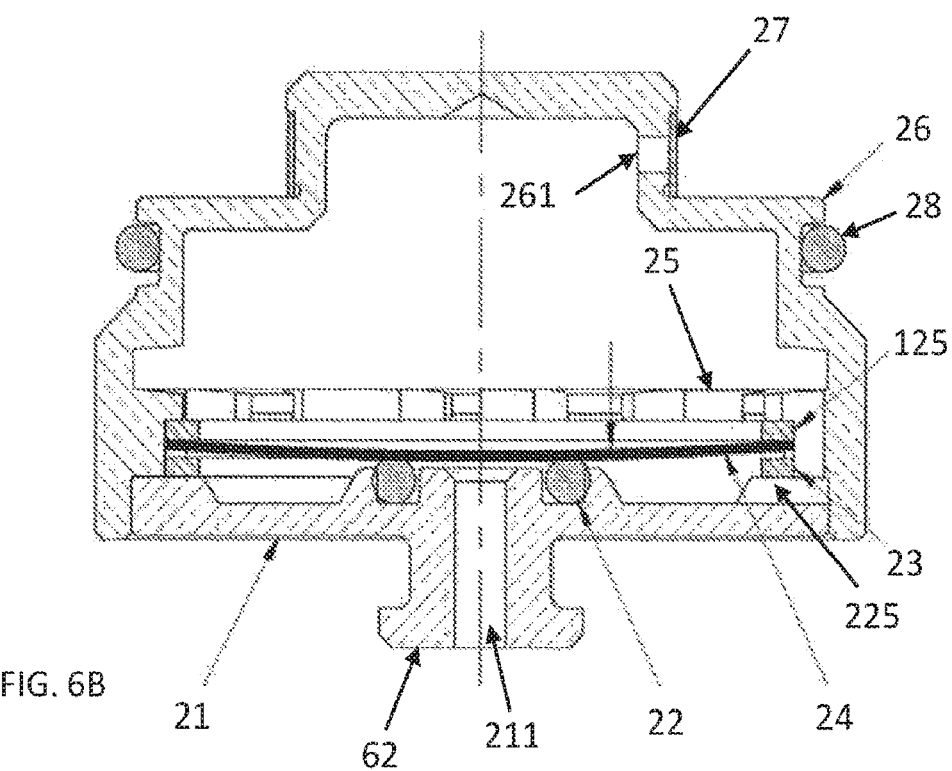
FIG. 6B is a detailed view of the thermostatically operated valve cartridge of FIG. 6 in a closed position, so as to prevent flow between the higher temperature line and the lower temperature line.

The flow around the outer circumference of the disc is made possible by the scalloped, i.e., interrupted, edge surfaces, supporting both sides of the outer circumference of the biflexive disc, as shown in greatest details in FIGS. 6A, B, 7, 7A and 8. In these drawings the supporting shelves 125,225 for the washers 23,25 are scalloped, i.e., discontinuous, so that the support shelves 125,225 are interrupted by indentations that permit the desired equalizing pressure flow between the front and back of the bi-flexive disc and also provide for the net flow when the disc is snapped into the open position. The sizing of the shelf portions and the open portions are balanced so as to provide the desired flow rate for the hot water in the open position versus the need for sufficient circumferential support in order to achieve sufficiently stress-free maintenance of the disc.

In one example, when utilizing a disc having a one-inch diameter and a thickness of 0.016 inch, the supporting flat surfaces 125,225 occupy approximately 34% of the circumference of the disc and the open spaces between the supporting shelves 1256,225 66% of the circumference of the disc. The specific parameters are to be determined based upon the circumference of the individual disc, the materials from which it is made, the required flow capacity and the pressure drop between the hot water line and the cold water line. Generally, the supporting flat surfaces of the shelves comprise at least 10% of the circumference, and extend radially inwardly from the outer circumference a distance of at least 10% of the radius. Regardless of the proportions, it is preferred that the supporting shelf portions 125,225 be opposite each other so as to support the disc equally on both major surfaces.

When the disc is caused to move by snapping into the open position by virtue of a reduced temperature on the hot water side of the disc (as hot water is cooled by the surrounding ambient air), the disc moves upwardly, away from the central O ring 22, allowing flow to pass outwardly through the exhaust channel 211, which in this embodiment is centrally located within the cartridge tailpiece 62. Fluid is caused to flow through the device by virtue of a relatively small pressure differential between the hot and cold water sides of the valve. This pressure differential is generated, as shown in the overall flow system drawing of FIG. 9, by a circulator pump 51 installed in the hot water distribution pipe, preferably adjacent the hot water source which, in this drawing, is exemplified as a hot water tank 55.

Figure 9:
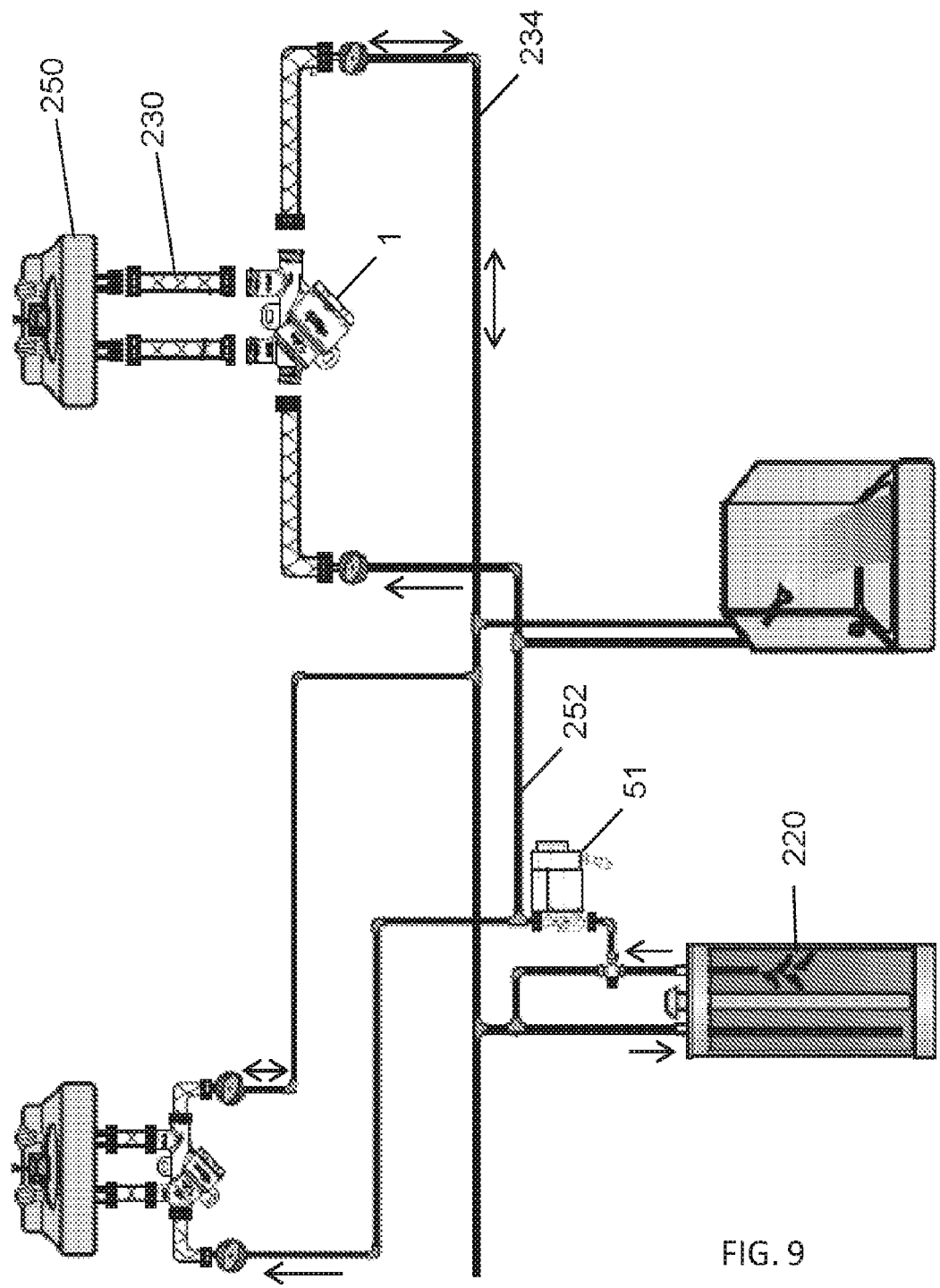
FIG. 9 is a diagrammatic view of a simplified example of a hot and cold water system in a residential house.

Under ambient conditions, i.e., room temperature, the bimetal disc is in a neutral, open position, as shown in FIG. 6A, providing a gap between the disc in the central area and the face-sealing O-ring 22. As the water temperature surrounding the bimetal disc on its hot water side increases to a desired maximum temperature relative to the cold water, downstream side (for example, 110° F.-45° F.), the bimetal disc will instantaneously snap in the direction opposite its neutral position so as to contact the face seal 22, thereby stopping the flow of hot water through the device. If there is no hot water flow, and the water temperature on the upstream side of the disc 24 decreases to below a predetermined minimum temperature target (for example 80° F.), the bimetal disc 24 will instantaneously snap back to its original neutral, open position, allowing hot water to flow through the valve body and into the cold water pipe, causing cold water to flow back into the hot water tank 55, as shown in the drawing of FIG. 9. The disc will once again snap back to its closed position once the hot water temperature on the upstream side increases to the predetermined maximum temperature target.

Based upon the pressure differential created by the pump 55, between the hot water line and the cold water line, the cartridge inlet and outlets 261 and 211, are critically sized to restrict fluid passing through the device to a maximum allowable flow rate. This ensures a minimal pressure differential between the two sides of the bimetal disc 24. The forces on the bimetal disc 24 resulting from flow conditions are limited to a negligible magnitude as the sum of each of the cross-sectional flow hole areas 261 and 211 are minimized in relation to the cross-sectional area between the bimetal disc 24 and the face sealing O ring 22.

The inlet to the valve cartridge 26 may be in line with the bimetal disc 24 or, preferably, as shown in the accompanying drawings, is perpendicular to the bimetal disc passing through the screen filter 27. The flow then circumferentially flows around the bimetal disc and then out the central opening of the valve cartridge 211.

By structurally supporting the bimetal disc evenly around its outer circumference from both sides of the primary surfaces, undue stress is avoided on the material of the disc, thereby extending its operating life. By sealing the disc along its central portion and opening that to allow flow, the disc maintains its circumferential supports, while opening and closing to permit flow, as the upstream temperature fluctuates. The circumferential supports however, are scalloped, so as to allow the higher temperature hot water to contact most of the area of the downstream side of the bimetal disc, even when no flow out of the valve body is permitted through the central hole 211.

The bimetal disc is preferably formed of two different alloys, having different thermal expansion coefficients, sandwiched together between the top and bottom major surfaces. The side contacting the central O ring 22 can be formed, for example, as is shown in the following table of three of the most commonly available bimetal disc materials. Each of these various formulations has advantages as well as disadvantages. The TM1, for example, because it is substantially free of manganese, is less susceptible to cracking and does not require a coating to protect it against corrosion when using the system between a hot water and cold water line. TM2 has a greater flexivity value and is lowest in cost, but requires a parylene polymer coating in order to protect it from corrosion and is also susceptible to cracking after extended use. Truflex standard discs utilize an industry standard that is also generally accepted, and can be used for this purpose. For residential hot water systems, corrosion resistance is important, but range of movement less so because of the low flow rates required, and temperature range tolerances are less critical in such systems, and low flexivity can be compensated for in the particular mechanical design forming the present invention.

When the thermostatically operated by-pass valve of the present invention is used for providing continuous on demand hot water to a sink tap, e.g., in a residence, the valve is provided together with a circulator that is connected in the hot water line, preferably adjacent the hot water source; a return line is provided by the cold water line back to cold water inlet to the hot water source, e.g., the hot water tank.

A special line is not required as, by returning into the cold water line, this cold water line always has a connection to the hot water tank; as long as the cold water taps are closed, all of the water from the hot water line, passing through the by-pass valve of this invention, and entering the cold water line, will be returned to the, e.g., hot water tank, and thus not be wasted down the drain.

It has been found that a circulator pump that provides as low as a 5 psi differential is sufficient to allow this system to operate effectively in a residential situation. It is believed that the optimal size for the bimetal disc is in the range of 0.75 inch to 1.5 inches for the usual residential single family home in the U.S. In other situations, a smaller or larger bimetal disc could be preferable, depending upon the quantity of flow required, and the temperature differential that would be utilized to cause the bimetal disc to flex. Preferably, the bimetal disc is formed of two different alloys in accordance with ASTM specs referred to as TM1 and TM2, or another industry standard, the Truflex standard. Generally, these discs are formed of alloys containing nickel, chromium, manganese, copper, iron, aluminum, carbon nickel iron, cobalt, chromium and manganese on the two different sides. By eliminating aluminum, carbon and copper from one side and including or excluding cobalt from the second side, a variety of effects can be achieved.

Two discs formed of different metal alloys with different coefficients of thermal expansion are co-bonded together to form the bimetallic disc. There also are trimetal discs having three discs sandwiched together, but these are less commonly used and present greater difficulty in determining the coefficients of thermal expansion among the three sandwiched discs. They do have special uses, but would generally not be used in the present situation. The biflex metal discs each generally contain nickel in substantial percentages, as well as iron, cobalt, chromium, manganese and, in some cases, copper. Some of the bimetal or trimetal discs can include a percentage of aluminum as well on one or more of the discs. The proportions of metal in each alloy are significant in that, for example on the hot water side, manganese is a problematic component as manganese may even dissolve in water. On the other hand, the other materials are important in order to get the necessary flexure as a result of the temperature drop across the bimetal disc, as well as the ability to avoid any type of deterioration from, for example, corrosion or such items as dissolution of any of the metal components.

Except as needed to meet the critical properties of the discs, the composition of the two discs is not critical and does not form a part of this invention. Many different combinations of compositions can be selected within the scope of this invention. It is for this reason that although 'bi-metal' discs are most commonly used for this purpose, there is no reason why two polymer discs having sufficiently different coefficients of thermal expansion could not be used, or alternatively one polymer disc layer bonded to one metal disc layer. Accordingly, the term "bi-flexive disc" should be considered a shorthand for any thermostatically flexive snap disc that can snap into a new position depending upon the temperature to which the bi-flexive disc is in contact.

The system, preferably, is constructed so as to minimize stress on the disc caused by the pressure differential between the hot and cold water lines when the device is in the closed, no flow condition, by permitting the higher pressure hot water to almost surround the bimetal disc, except for the relatively small portion contacting the central O-ring. This is achieved by providing the circumferential flow openings, which allow the higher pressure water to exist on both sides around a large annular space, but not permit the hot water to flow outwardly into the cold water line.

The other parts of the system, the overall cartridge body and tailpiece, are preferably made of a corrosion resistant material, such as stainless steel, brass, copper or plastic. The valve body and retaining stem are also of similar material, but are even subject to greater chemical stresses and, therefore, include not only brass, but also bronze. A suitably structurally strong polymer plastic material can also be used. The sealing washers and supporting washers are preferably a resilient plastic material such as Teflon, which is generally inert to all of these materials that may be in the fluid flow, but may also be relatively hard materials such as stainless steel or brass. Such materials of the harder variety have to be more carefully positioned and absolute dimensions become more critical. The symmetrical placement of the washers formed of relatively soft polymer materials, such as Teflon around the circumferences of the bimetal discs protect the discs from abrasive surfaces.

Although the entire surface of the disc on the downstream side is not open to the upstream hot water pressure when the disc is in the non-flow sealing position, the proportion of the surface that is blocked by the central O ring is not sufficient to create physical stress problems that would otherwise cause structural failure of the disc. This allows the disc to be less thick than might otherwise be necessary if structural strengths became a significant issue. Note that the stop valve or check valve in the cold water line prevents any backflow of cold water into the hot water line, thereby avoiding temperature problems when the hot water tap is opened and the pressure in the hot water line may drop.

The present design can be considered a "free floating" disc design, different from the center post support used by the prior art. It is this free floating disc design, where the disc is constantly supported around its outer circumference from either side of the disc, that enables this disc to perform in a superior and more effective, durable way.

The overall system of the present invention in one embodiment is shown in FIG. 9 above. This system includes a hot water tank 220 which provide hot water to a pair of sinks and a bath facility. The system also includes a cold water line extending from a municipal source for example, which goes to the cold water tap of the sinks and bath facility and also has an elbow for providing cold water to the hot water heater 220. A small pump 51 is provided in the hot water line between the hot water tank and the tap, preferably adjacent to the hot water tank, so as to provide a small pressure head to the hot water line relative to the cold water line, upstream of the valve of the present invention, which would otherwise have substantially equal pressure.

The valve of the present invention is connected between the hot and cold water lines to a sink or other water outlet, preferably including the tap farthest from the hot water tank, upstream of the two water taps in the sink. When there is hot water usage in the system, the temperature of the hot water upstream of the valves in line 252 remains high. However, after an extended period of non-use, for example, during the day when most people are not in their residences, the temperature of the water in line 252, especially during a cold winter season, would fall below the desired hot water temperature by a significant amount. When the temperature of the water in line 252 immediately adjacent the sink 230 falls below a certain value, the disc 24 snaps to the open position as shown in FIGS. 6 and 6A to permit the flow of hot water from the higher pressure hot water line through the valve body and into the cold water line at 232, which then causes the flow from that cold water line, through pipe 234 and back to the hot water tank where it would be reheated. In this way no water is wasted and, as soon as the temperature in the hot water line upstream of the valve reaches its desired high temperature, the bi-metal disc 24 snaps back to its closed position, thereby shutting off all net flow.

It is noted that the pump 51 is independently operated and can either operate constantly as it is only achieving a very low pressurization, i.e., generally not more than 5 psi differential, or can be caused to operate only at specified time, depending upon the control system for that pump. Its only purpose is to provide the necessary pressure increase so that when the disc 24 snaps into the open position, water will flow from the hot water line into the cold water line, which would be at a lower pressure. In the event of a pressure failure, the check valve 4 in the cold water line prevents backward flow from the cold water line into the hot water line. Generally, it has been found that a hot water temperature from the tap of at 110° F. is considered comfortable, whereas if that hot water line temperature cools to below 80° F., it is too cool for the intended use. In that case, the valve 24 will snap into the open position when the hot water is at 80° F. and re-snap back to the closed position when the temperature reaches 110° F.

Different grades of materials can be used for bi-flexive discs; there are bi-metal discs that are prepared in accordance with ASTM grades as well as so-called industry grades which are also readily available and have known characteristics. The user must determine, based upon the parameters of use to which a particular valve is to be put, exactly what materials should be used and what size disc would be most suitable. Of course, the surrounding valve body supporting and containing the bi-flexive disc valve must be designed accordingly with respect to size and open space. A standard source of the bi-flexive composite material or trimetal composite material is made by Engineered Material Solutions and sold under the Trueflex trademark.

The space between the support shelves 125,225 and the bi-flexive disc permits a greater flow area, i.e., the distances between the supporting points, than would otherwise be effective without the washers. It is for that reason that the material forming the washers 23,25 is important in determining whether sufficient stress-free support is achieved when there is sufficient flow openings to ensure pressure equalization between the upstream and downstream sides of the major surfaces of the bi-flexive disc. Accordingly, materials such as Teflon or metals have sufficient rigidity that they will not collapse into the open spaces and thus reduce flow area. As designed, the washers 23,25 should remain substantially on the same level, whether it is on the support points or extending across the channel flow areas. Materials having sufficient rigidity include, for example, polymers such as Teflon and other halogenated hydrocarbon polymers as well as certain polyalkanes such polypropylene, as well as many metals. Preferably, if a metal is used to manufacture the washers, it is preferably softer than the metal of the bi-metal disc surface.

In operation, when the by-pass valve 1 of the present invention is in place between the hot water and cold water taps, e.g., beneath a sink 250, as in the embodiment of the example shown in FIG. 9, the pump 51 in the hot water line 252 is turned on and generates approximately a 5 psi additional pressure above the pressure in the cold water line 234. When the temperature of the hot water in the valve surrounding the bimetal disc 24 drops below, for example, 80° F., the different flexing characteristics of each side surface (or material layer) forming the bimetal disc cause the disc to flex away from its central contact with the central O-ring 22, thereby opening the valve for passage of hot water, bringing new hot water into the pipe and causing the cooler water to flow out through the cold water line and ultimately back to the hot water tank 220, as is shown in the drawing of FIG. 9, showing an overall water system in a single-residence household.

When the hot water auxiliary pump 51 is not turned on, the pressure between the two lines will be substantially identical and there will be substantially no flow between the hot and cold water line, whether or not the disc is in the open or closed position, relative to the central O-ring 22. Thus, programming of the auxiliary pump in effect dictates whether the continuous hot water system will be operational or whether it will operate only at certain designated times, for example, early in the morning or in the evening, and will not operate in the middle of the day, thus saving fuel for the hot water system during the day.

The design of the present invention allows for straight forward manufacturing and avoids the difficult balancing required for a central opening through the bimetal disc. The foregoing description of a preferred embodiment of this invention is illustrative of the advantages therein. It is not exhaustive or limiting of the invention to the specific form disclosed herein. Obvious modifications or variations accessible to persons skilled in this art are within the scope of this invention and the present embodiment was selected and is described herein to provide a clear illustration of the principles of the present invention and its practical application to plumbing systems, but is not limited to that. Modifications and variations accessible to persons skilled in the art should be considered to be within the scope of this invention and the scope is to be determined solely by the following claims. The following claims define the scope of this invention.

What is claimed is:

1. A wholly mechanical thermostatically operated by-pass valve system to allow for flow between a high temperature, higher pressure, liquid line and a cool temperature, lower pressure, liquid line in order to maintain the instantaneous-availability of high temperature liquid adjacently upstream of the bypass valve system, the bypass valve system being so designed as to operate in a system where the high temperature liquid line presents at a higher pressure than the cool temperature liquid line; the bypass valve system comprising:

a liquid-tight, outer shell defining an internal volume;

a first internal wall within the outer shell, dividing the internal volume within the outer shell into a first internal volume section and a second internal volume section and having a single central opening extending through the first internal wall and capable of connecting the two internal volume sections within the outer shell and a valve seat, surrounding the single central opening;

an inlet and an outlet connected with the first volume section connectable into the hot water line;

an inlet and an outlet connected with the second, internal volume section connectable into a cold water line; in use, the hot water line is intended to have a higher pressure than the cold water line;

the valve seat surrounding the single central opening through the first internal wall, between the two internal volume sections within the outer shell;

a snap action valve body and a second internal wall, the second internal wall section being located within the first internal volume, and the valve body comprising:

a thermostatic bi-flexive disc having opposed major side surfaces, formed of two different materials, and an outer circumference, the disc being supported axially adjacent the valve seat along its outer circumference between a first annular support shelf surface and a second annular support shelf surface, such that the central section of the bi-flexive disc is located adjacent the valve seat, and is capable of snapping between a closed position, in sealing contact with the valve seat, and an open position out of contact with the valve seat, wherein in the closed position, the bi-flexive disc provides a sealing contact with the valve seat, and is thus capable of closing off any liquid flow between the two internal volume sections of the outer shell, and wherein in the open position, the bi-flexive disc is positioned to allow flow through the single central opening between the two internal volume sections;

the two annular shelf support surfaces are discontinuous so as to support the outer circumference of the bi-flexive disc of the annular washer between the two shelves, the alternating contact surfaces of the two annular shelves support the disc circumferentially, so that the alternating openings between the two annular support shelf contact surfaces permit fluid flow around the outer circumference of the disc, whether the valve body is in the open position or in its snap-closed position, so as to allow any liquid in the first internal volume section, which, in use, is in continuous open contact with the high temperature liquid line, to flow around both surfaces of the bi-flexive disc, except for the central part of the disc when the disc is in sealing contact blocking the single central opening through the first internal wall, so as to block all flow between the two internal volume sections, in a manner so as to allow liquid in the high temperature internal volume section to contact both major surfaces of the bi-flexive disc except for the central portion in contact with the valve seat when the bi-flexive disc is in the closed, sealed position, so as to limit stress on the bi-flexive valve disc that can result from any pressure differential across the bi-flexive disc, and to thus avoid possible high stress on the valve disc from any pressure differential between the two internal volume sections, wherein the two different materials forming the thermostatic bi-flexive disc have different thermal expansion properties, the material having the greater thermal expansion value forms the major side surface of the bi-flexive disc facing the valve seat, so that when the liquid in the high temperature section is at a temperature above a predetermined desired value, the bi-flexive disc is in the closed position sealed against the valve seat, and when the temperature in the high temperature section falls below the predetermined desired value, the bi-flexive disc snaps open to permit liquid flow from the first internal volume section into the second internal volume section through the valve seat.

2. The wholly mechanical thermostatically operated valve system of claim 1, further comprising support O-rings on the two annular shelves and in contact with the outer circumferential portion of the two sides of the bi-flexive disc valve body to circumferentially support the bi-flexive disc in both the open and closed positions.

3. The wholly mechanical thermostatically operated valve system of claim 2, further comprising a one-way check valve located in the outlet from the second internal volume section, of the outer shell to prevent flow of a liquid from the cool temperature liquid line into the second internal volume section of the outer shell-when the bi-flexive disc is in the open position.

4. The wholly mechanical, thermostatically operated valve system of claim 2, wherein the bi-flexive disc has a diameter of between 0.3 in. and 1.5 in.

5. The wholly mechanical, thermostatically operated valve system of claim 3, wherein the bi-flexive disc has a thickness not greater than 0.05 in.

6. The wholly mechanical thermostatically operated valve system of claim 1, wherein the pair of annular shelves circumferentially support the bi-flexive disc between them and extend radially inwardly from the outer circumference a distance of at least 1% of the radius of the-bi-flexive disc.

7. The wholly mechanical, thermostatically operated valve system of claim 1, wherein the opposed major side surfaces of the bi-flexive disc are formed of two different materials having distinctly different coefficients of thermal expansion, and which are bonded together.

8. The wholly mechanical thermostatically operated valve system of claim 7, wherein the two different materials forming the bi-flexive disc are two different metal alloys, wherein the alloys have distinctly different coefficients of thermal expansion.

9. The wholly mechanical thermostatically operated valve system of claim 1, wherein the system further comprises a cold water inlet line, a heater for heating water, the cold water inlet line being connected to the heater, a hot water inlet line extending from the heater, a hot water tap connected to the hot water inlet line downstream of the heater, the inlet to and outlet from the first internal volume section of the internal volume of the valve body being connected into the hot water inlet line intermediate the heater and the hot water tap, a cold water tap connected to the cold water inlet line and the outlet from the second internal volume section of the internal volume of the valve outer shell being connected to the cold water inlet line upstream from the cold water tap.

10. The wholly mechanical thermostatically operated by-pass valve system of claim 1, wherein the materials forming the two surfaces of the bi-flexive disc are formed of metal alloys formed from the metals selected from the group consisting of nickel, iron, cobalt, chromium, aluminum, manganese and copper.

11. The wholly mechanical thermostatically operated by-pass valve system of claim 10, wherein at least one of the metal alloys contains manganese and the disc surfaces have a corrosion resistant coating.

12. A building having a water supply system, the water supply system comprising:

a cold water source inlet from an external source of cold water; a water heater; a cold water source inlet line to the water heater and in fluid flow connection with the cold water source inlet; a hot water line in fluid flow connection from the water heater; a plurality of hot water taps in the building in fluid flow connection with the hot water line downstream of the water heater; a plurality of cold water taps in the building in fluid flow connection with the cold water source inlet line; a pump in the hot water line intermediate the water heater and the plurality of hot water taps, the pump designed to increase the pressure within the hot water line in fluid flow connection from the water heater through the hot water line; and a plurality of wholly mechanical, thermostatically operated valve systems in accordance with claim 1, each such valve system being located in fluid flow connection between the hot water pump and a its respective hot water tap, and in fluid flow connection with the cold water source inlet line, wherein the hot water pump is in fluid flow connection with the inlet to the first internal volume section of each of the valve systems, and the cold water source inlet line is in fluid flow connection with the outlet from the second internal volume section of the internal volume of the valve system, downstream from the cold water taps, the outlet from the first internal volume section of the internal volume of each valve system is in fluid flow connection with its respective hot water tap;

whereby when the bi-flexive disc is in the sealing contact position with the valve seat, and the hot water taps are closed, after a period of time determined by when the temperature of the water within the first internal volume section of the outer shell of the wholly mechanical, thermostatically operated valve system falls below the predetermined temperature, the bi-flexive disc will snap open, allowing hot water from the building hot water line to flow into the high temperature section of the outer shell, and to allow the water in the first internal volume section to flow into the second internal volume section of the internal volume and out the outlet from the second internal volume section into the cold water line, so that the temperature of the water in the first internal volume section is increased to above a predetermined temperature, when the predetermined temperature is reached, the bi-flexive disc will snap closed to stop fluid flow, whereby there will always be available water above a predetermined temperature as soon as a hot water tap is opened.

13. The building water supply system of claim 12, wherein the water pump located in the hot water line between the water heater and the inlet to the first internal volume section increases the pressure on the water in the hot water line, providing for the flow from the hot water line to the cold water line when the bi-flexive valve opens.

* * * * *